Dec. 6, 1927.
G. C. FEDDERMAN
AUTO LOADING BUCK
Filed June 3, 1927
1,651,517
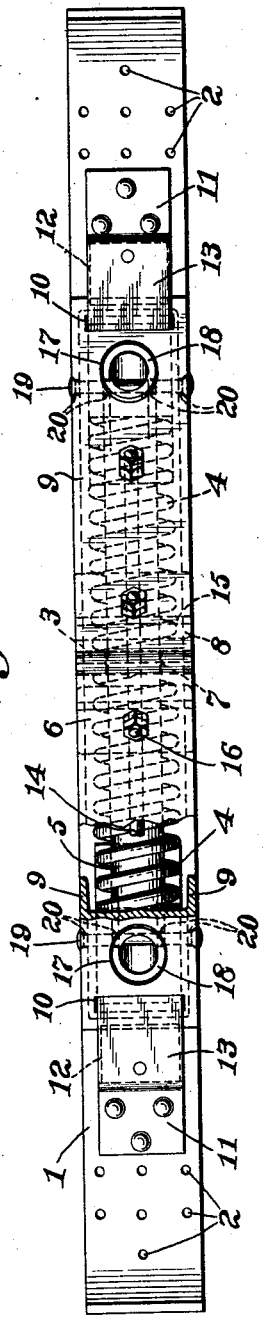
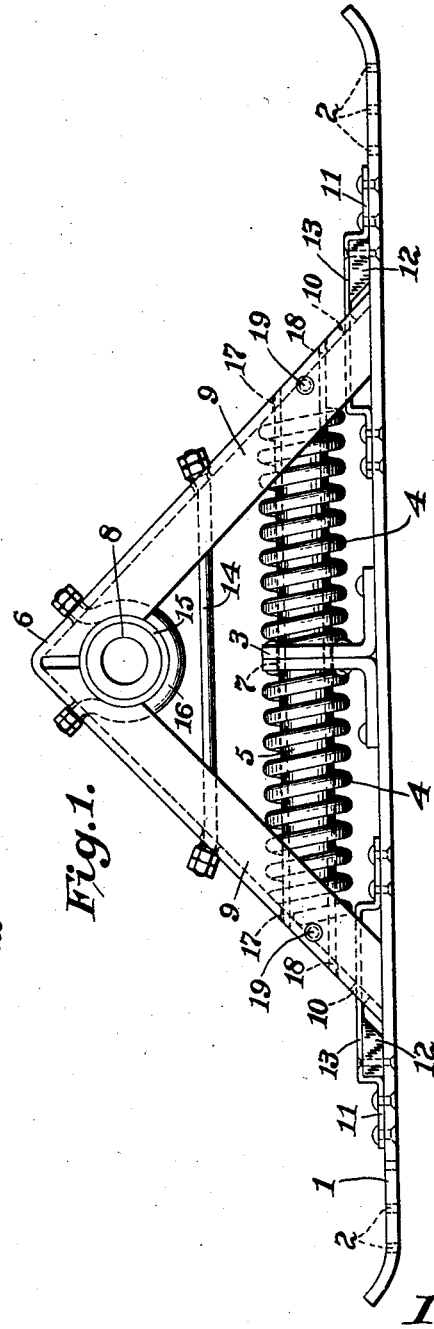
Inventor:
George C. Fedderman, is of tubular form and its connections to the channel shaped legs 9 of the support are each made by providing the web of the channeled legs with a hole 17 to receive an end 18 of the tubular guide member, and a securing pin 19 is then passed through aligned transversely disposed holes 20 in the flanges of the channeled legs and in the tube.

I claim:

1. In apparatus for loading and supporting vehicles or the like upon freight cars, a base having an upstanding abutment, a bearing support movably mounted on said base plate with respect to said abutment and spring means interposed between said support and abutment for yieldably resisting such movement, and a bearing in said support to receive a part of the vehicle supported.

2. A vehicle loading buck comprising an elongated base plate having an upstanding lug abutment transversely disposed with respect to said plate, said lug having a hole therethrough facing longitudinally of said plate, an inverted V-shaped bearing support having a bearing for a part of the supported vehicle at its apex, slidable connections between the lower ends of the legs of the support and the base plate, said support having a tie rod connecting its legs adjacent their lower ends, said tie rod passing through the hole in said abutment and passing through coil springs one on each side of said abutment, said springs bearing against the abutment and against the legs of the support to yieldably resist relative movement between the support and the base plate.

3. Apparatus according to claim 2 in which the slidable connections between the ends of the legs of the support and the base plate are provided by said legs each having a slot in its lower end, and substantially inverted U-shaped guide members, one passing through each of said slots and secured to said base plate on opposite sides of the legs and permitting limited sliding movement of the support with respect to the base plate.

4. A vehicle loading buck comprising a base having an upstanding abutment, an inverted V-shaped bearing support having a bearing for a part of the supported vehicle at its apex, said bearing support straddling said abutment, coil springs mounted one on each side of said abutment and bearing thereon, and bearing at their outer ends against the legs of said support, and a slidable connection between the lower end of each leg of the support and the base.

5. A vehicle loading and supporting buck comprising a base having an upstanding abutment, said abutment having a hole therethrough, a delta-shaped bearing support having at its upper apex a bearing for a part of a supported vehicle, the horizontal member of said delta-shaped support passing through said hole and through coil springs mounted one on each side of said abutment and each bearing at one end against said abutment and at the other end against the support, and a slidable connection between the support and said base.

In testimony whereof, I affix my signature.

GEORGE C. FEDDERMAN.

Patented Dec. 6, 1927.

1,651,517

UNITED STATES PATENT OFFICE.

GEORGE C. FEDDERMAN, OF DETROIT, MICHIGAN, ASSIGNOR TO AUTO LOADING DEVICE MANUFACTURING COMPANY, OF DETROIT, MICHIGAN, A CORPORATION OF MICHIGAN.

AUTO-LOADING BUCK.

Application filed June 3, 1927. Serial No. 196,318.

This invention relates to apparatus for supporting automobiles or other vehicles during transportation.

An object of the invention is to provide a strong, durable support for a vehicle, which is adapted to hold the vehicle out of contact with the floor of the transportation conveyance.

A further object is to render the support capable, when secured to the floor of the transportation conveyance, of absorbing shocks transmitted to it from the conveyance so that the shocks will have no injurious effect on the supported vehicle.

Other objects will appear hereinafter.

The invention consists in the features, combination and arrangement of parts hereinafter described and particularly pointed out in the claims.

In the drawings:

Figure 1 is a side elevation of the support or loading buck constituting the invention.

Fig. 2 is a plan view partly in section showing the channeled form of the legs of the support and the springs bearing against the legs.

Referring to the drawings of the shock absorbing loading buck, 1 represents an elongated base plate having holes 2 in its ends for the passage of nails or screws to secure it to the floor of the freight car. The plate 1 has at its center, integral therewith or secured thereto, an upstanding lug 3 of plate form transversely disposed with respect to said base plate and which serves as an abutment for coil springs 4. A guide member 5, secured at its ends to the respective legs 9 of the support 6 and movable therewith, passes freely through a hole 7 in the abutment lug 3 and through the springs 4 to guide and support the springs. The other ends of the springs bear against the legs 9.

The support 6 is of inverted V shape and carries a bearing 8 at its apex for receiving a part of the vehicle to be supported. The bearing 8 may be adapted to receive an axle as shown, or without departing from the invention, may be adapted to support a hub or spring, and the bearing is lined with any suitable material such as rubber or rawhide to protect the supported part of the vehicle from abrasion.

The legs 9 of the support 6 have slots 10 cut through their outer or lower ends to provide for the reception therein and passage therethrough of inverted U-shaped guide plates 11 which are adapted to be secured at their ends to the base plate 1. The guide plates 11 serve to guide and limit the base plate with respect to any relative movement thereof with respect to the support 6. Abutments 12 of rubber or any suitable material are provided beneath the raised portion 13 of the guide plates 11 to limit the relative movement between the base plate 1 and the support 6.

It will be readily seen from the foregoing description that when shocks are imparted to the loading buck through the floor of the transportation conveyance the base plate 1 will receive them but the springs 6 will absorb the shocks and prevent them from materially affecting the support 6 and the vehicle supported. The loading buck may be made of wood, except for the metal springs, or may be made of metal. The invention is not limited to a support for any particular part of the vehicle supported, although the form shown is adapted to receive and support an axle and in this case where an automobile is supported, four loading bucks would be used to support it out of contact with the floor of the freight car. The device could be used to support an automobile or other vehicle with or without the wheels removed and the loading buck could be provided with supporting structure of sufficient height to support one automobile above another in double decker arrangement within the scope of the invention.

The support 6, where made of metal, may comprise a channel bar (see Fig. 2) with its flanges cut away at its mid-point so it can be bent to inverted V-shape, as shown in Fig. 1, and secured in bent form by tie-rod 14. Or the support 6 may be cast in one piece. The bearing 8 as shown comprises a metal sleeve 15 secured to the apex of support 6 by U-bolt 16 and the sleeve is lined with the bearing material to prevent abrasion of the axle.

The guide member 5, as shown in Fig. 2,